(12) United States Patent
Ren et al.

(10) Patent No.: US 12,188,423 B2
(45) Date of Patent: Jan. 7, 2025

(54) CYLINDER DEACTIVATION CONTROL METHOD AND APPARATUS OF ENGINE, AND ENGINE

(71) Applicant: WEICHAI POWER CO., LTD., Shandong (CN)

(72) Inventors: Haifeng Ren, Shandong (CN); Fei Wang, Shandong (CN); Bin Pang, Shandong (CN); Qingzhen Ma, Shandong (CN); Huihui Wang, Shandong (CN); Lin Chen, Shandong (CN); Wenchao Mo, Shandong (CN); Xianfa Xu, Shandong (CN)

(73) Assignee: WEICHAI POWER CO., LTD., Shandong (CN)

( * ) Notice: Subject to any disclaimer, the term of this patent is extended or adjusted under 35 U.S.C. 154(b) by 0 days.

(21) Appl. No.: 18/748,323

(22) Filed: Jun. 20, 2024

(65) Prior Publication Data

US 2024/0352900 A1    Oct. 24, 2024

(30) Foreign Application Priority Data

Apr. 20, 2023    (CN) .......................... 202310423333.4

(51) Int. Cl.
*F02D 41/00* (2006.01)
*F02D 13/06* (2006.01)
*F02D 41/24* (2006.01)

(52) U.S. Cl.
CPC ....... *F02D 41/0087* (2013.01); *F02D 41/009* (2013.01); *F02D 2200/0614* (2013.01); *F02D 2200/1002* (2013.01); *F02D 2200/101* (2013.01)

(58) Field of Classification Search
CPC ...... F02D 13/06; F02D 41/00; F02D 41/0087; F02D 41/009; F02D 41/2467;
(Continued)

(56) References Cited

U.S. PATENT DOCUMENTS

| 10,221,803 B2 * | 3/2019 | Ikemoto | ............... F02M 47/027 |
| 2015/0000620 A1 * | 1/2015 | Orban | ................... F02D 17/026 |
| | | | 123/52.1 |

(Continued)

FOREIGN PATENT DOCUMENTS

| CN | 1715620 A | 1/2006 |
| CN | 107237697 A | 10/2017 |

(Continued)

*Primary Examiner* — Logan M Kraft
*Assistant Examiner* — Johnny H Hoang
(74) *Attorney, Agent, or Firm* — George Likourezos; Carter, DeLuca & Farrell LLP

(57) ABSTRACT

In a cylinder deactivation control method of an engine, a cylinder deactivation trigger moment of a to-be-controlled engine is determined; a second cycle and a cylinder deactivation mode corresponding to the next first cycle are determined according to the crankshaft rotation speed at the cylinder deactivation trigger moment, the target torque at the cylinder deactivation trigger moment, and a second cycle and a cylinder deactivation mode corresponding to the current first cycle at the cylinder deactivation trigger moment; the cylinder pressure type of each cylinder in the current first cycle is determined in conjunction with the cylinder deactivation modes of three adjacent first cycles; the fuel injection quantity of each ignition cylinder in the current first cycle is determined based on the calibrated preset fuel injection quantity chart of the first cycle.

20 Claims, 6 Drawing Sheets

(58) Field of Classification Search
CPC ............. F02D 41/3836; F02D 41/2432; F02D 41/403; F02D 41/405; F02D 2200/024; F02D 2200/0602; F02D 2200/0614; F02D 2200/1102; F02D 2200/1006; F02D 2200/101; F02D 2200/602; F02D 2200/604; F02D 35/023; F02D 2041/389; Y02T 10/12
See application file for complete search history.

(56) References Cited

U.S. PATENT DOCUMENTS

| | | | | |
|---|---|---|---|---|
| 2015/0211430 | A1* | 7/2015 | Remele | F02D 41/0085 |
| | | | | 123/480 |
| 2016/0252033 | A1* | 9/2016 | Dye | F02D 41/3005 |
| | | | | 123/481 |

FOREIGN PATENT DOCUMENTS

| | | |
|---|---|---|
| CN | 108457756 A | 8/2018 |
| CN | 112709643 A | 4/2021 |
| CN | 115217641 A | 10/2022 |
| CN | 115839278 A | 3/2023 |
| CN | 115839279 A | 3/2023 |
| CN | 115841047 A | 3/2023 |
| CN | 115875141 A | 3/2023 |
| JP | H04-27718 A | 1/1992 |

\* cited by examiner

Cylinder number

|   | 1 | 2 | 3 | 4 | 5 | 6 |
|---|---|---|---|---|---|---|
| Cycle number 1 | 1 | 1 | 1 | 1 | 1 | 1 |

Cylinder number

|   | 1 | 2 | 3 | 4 | 5 | 6 |
|---|---|---|---|---|---|---|
| 1 | 1 | 1 | 1 | 1 | 1 | 0 |
| 2 | 1 | 1 | 1 | 1 | 0 | 1 |
| 3 | 1 | 1 | 0 | 1 | 1 | 1 |
| 4 | 1 | 1 | 1 | 0 | 1 | 1 |
| 5 | 1 | 0 | 1 | 1 | 1 | 1 |
| 6 | 0 | 1 | 1 | 1 | 1 | 1 |

Cylinder number

|   | 1 | 2 | 3 | 4 | 5 | 6 |
|---|---|---|---|---|---|---|
| 1 | 1 | 1 | 1 | 0 | 1 | 0 |
| 2 | 1 | 0 | 0 | 1 | 1 | 1 |
| 3 | 0 | 1 | 1 | 1 | 0 | 1 |

Cylinder number

|   | 1 | 2 | 3 | 4 | 5 | 6 |
|---|---|---|---|---|---|---|
| 1 | 1 | 0 | 1 | 1 | 0 | 0 |
| 2 | 0 | 1 | 0 | 0 | 1 | 1 |
| 3 | 1 | 0 | 0 | 0 | 1 | 1 |
| 4 | 0 | 1 | 1 | 1 | 0 | 0 |

FIG. 6

CYLINDER DEACTIVATION CONTROL METHOD AND APPARATUS OF ENGINE, AND ENGINE

CROSS-REFERENCE TO RELATED APPLICATION(S)

This application claims priority to Chinese Patent Application No. 202310423333.4 filed Apr. 20, 2023, the disclosure of which is incorporated herein by reference in its entirety.

TECHNICAL FIELD

Embodiments of the present disclosure relate to the field of engine control technologies, and in particular, to a cylinder deactivation control method of an engine, a cylinder deactivation control apparatus of an engine, and an engine.

BACKGROUND

An engine has poor oil consumption and poor exhaust temperature index in a low-load working condition region. In the dynamic skip fire (DSF) technology, the engine is enabled to work in a corresponding ignition fraction mode in each working condition region, so that dynamic cylinder deactivation can be implemented and the purpose of alleviating the oil consumption and the exhaust temperature of the engine in the low-load working condition region can be achieved.

However, the following problems exist in the dynamic skip fire technology:
1) In some DSF ignition fraction modes, the number of ignition times of each cylinder is not equal, and loads of each cylinder are unbalanced, which is not conducive to the overall life of the engine;
2) In some DSF ignition fraction modes, some cylinders do not ignite at all times. Because a certain degree of leakage exists in all cylinders, in order to ensure the in-cylinder pressure of the cylinders, after several small cycles are performed, a recharge operation is required to be performed on the cylinders;
3) In some DSF ignition fraction modes, the number of ignition cylinders in each small cycle are not all equal, which is not conducive to achieving the relatively stable working state, and is not conducive to the structural reliability and the noise, vibration, and harshness (NVH) of the engine;
4) The DSF ignition fraction mode does not perform a corresponding optimal configuration for the specific model; and
5) The DSF control strategy is relatively complex, and the electric control is difficult to implement.

SUMMARY

Embodiments of the present disclosure provide a cylinder deactivation control method of an engine, a cylinder deactivation control apparatus of an engine, and an engine, which solve the technical problems in the related art that the number of ignition times of each cylinder is not equal, loads of each cylinder are unbalanced, a working state is unstable, the setting cannot be performed for a specific model, and the control strategy is complex when the dynamic cylinder deactivation of the engine is controlled by using the dynamic skip fire technology.

In a first aspect, an embodiment of the present disclosure provides a cylinder deactivation control method of an engine. The cylinder deactivation control method includes:
acquiring a current crankshaft rotation angle of a to-be-controlled engine and a current crankshaft rotation speed of the to-be-controlled engine;
determining, based on the current crankshaft rotation angle, whether the to-be-controlled engine is at a cylinder deactivation trigger moment;
in response to a determination that the to-be-controlled engine is at the cylinder deactivation trigger moment, determining a working condition region of a next first cycle based on the current crankshaft rotation speed and a current target torque;
determining whether the working condition region of the next first cycle is identical to a working condition region corresponding to a second cycle in which a current first cycle is located;
in response to a determination that the working condition region of the next first cycle is identical to a working condition region corresponding to the second cycle in which the current first cycle is located, determining a cylinder pressure form of each cylinder in the current first cycle based on a cylinder deactivation mode of a previous first cycle, a cylinder deactivation mode of the current first cycle, and a cylinder deactivation mode of the next first cycle;
in response to a determination that the working condition region of the next first cycle is different from the working condition region corresponding to the second cycle in which the current first cycle is located, determining a position of the current first cycle in a second cycle matrix corresponding to the current first cycle based on a relationship between a number of working cylinders in a working condition region in which the current first cycle is located and a number of working cylinders in the working condition region in which the next first cycle is located, and determining a cylinder pressure form of each cylinder in the current first cycle based on a determined position of the current first cycle in the second cycle matrix corresponding to the current first cycle; and
determining a fuel injection quantity of each ignition cylinder in the current first cycle based on the cylinder pressure form of each cylinder in the current first cycle.

In a second aspect, an embodiment of the present disclosure further provides a cylinder deactivation control apparatus of an engine. The cylinder deactivation control apparatus includes a memory, a processor, and a computer program stored on the memory and executable on the processor, wherein the processor is configured to implement a cylinder deactivation control method of an engine described in the first aspect when executing the computer program.

In a third aspect, an embodiment of the present disclosure further provides a non-transitory computer-readable medium, which is configured to store a computer program which, when executed by a processor, performs a cylinder deactivation control method of an engine described in the first aspect.

The embodiments of the present disclosure disclose the cylinder deactivation control method of the engine, the cylinder deactivation control apparatus of the engine, and the engine. The cylinder deactivation trigger moment of the to-be-controlled engine is determined, a second cycle and a cylinder deactivation mode corresponding to the next first cycle are determined according to a crankshaft rotation speed at the cylinder deactivation trigger moment, a target torque at the cylinder deactivation trigger moment, and a second cycle and a cylinder deactivation mode corresponding to the current first cycle at the cylinder deactivation trigger moment, then a cylinder pressure type of each cylinder in the current first cycle is determined in conjunction with cylinder deactivation modes of three adjacent first cycles, and finally the fuel injection quantity of each ignition cylinder in the current first cycle is determined based on the calibrated preset fuel injection quantity chart of the first cycle. Therefore, the technical problems that loads of each cylinder are unbalanced, a specific configuration cannot be performed for the specific model, the NVH and the reliability are poor, and the control strategy is complex in the dynamic cylinder deactivation technology of the dynamic skip fire are solved, and thus the technical effects that the working state of the engine is stable, the loads are balanced, the control strategy is simple in logic, and the control precision is relatively high are achieved.

BRIEF DESCRIPTION OF DRAWINGS

FIG. 6 is a schematic diagram of a second cycle matrix in which different numbers of cylinders ignite to work according to an embodiment of the present disclosure.

DETAILED DESCRIPTION

Figure 1:
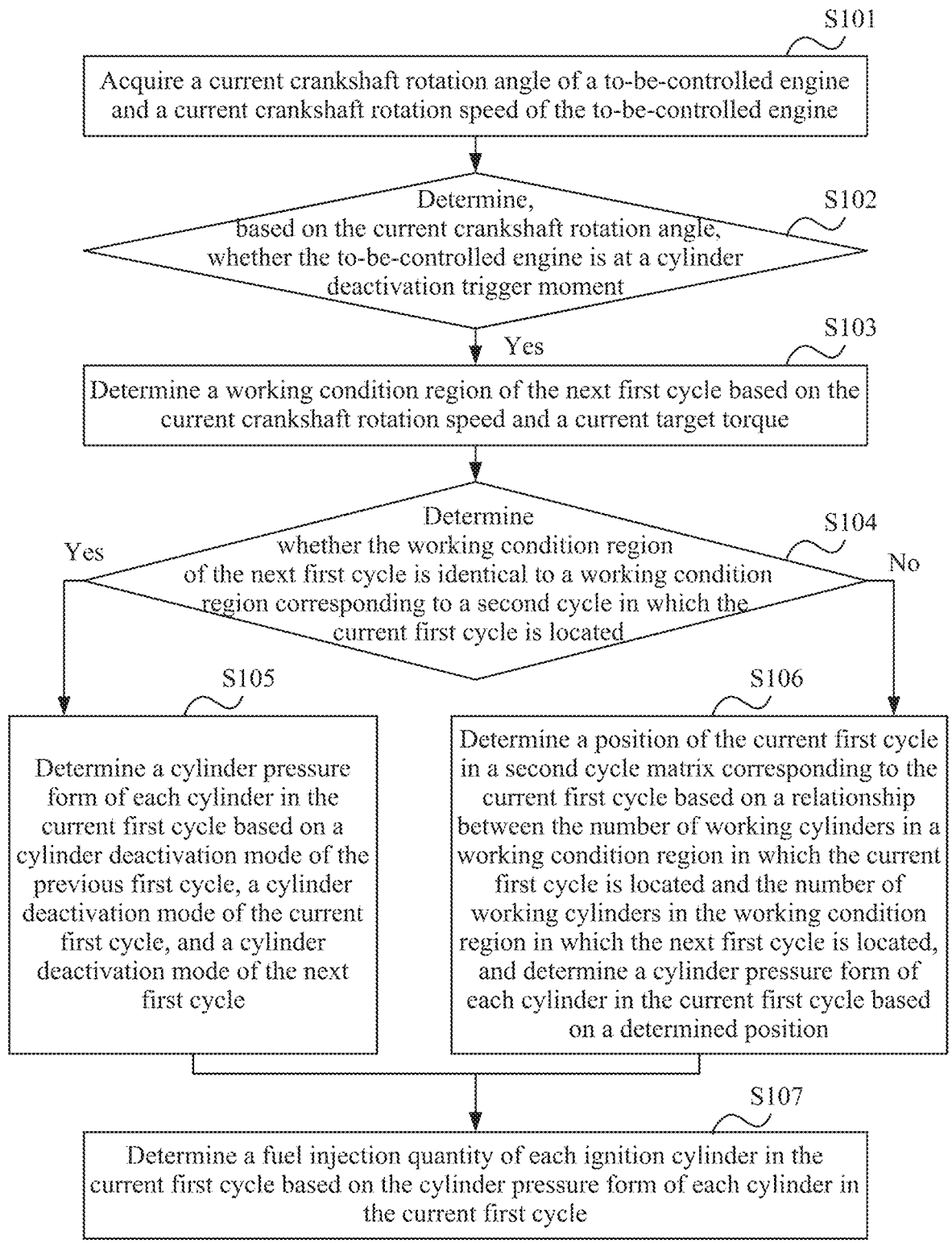
FIG. 1 is a flowchart of a cylinder deactivation control method of an engine according to an embodiment of the present disclosure.

The present disclosure is further described hereinafter in detail in conjunction with drawings and embodiments. It is to be understood that the embodiments described herein are intended to explain the present disclosure and not to limit the present disclosure. Additionally, it is to be noted that for ease of description, only part, not all, of the structures related to the present disclosure are illustrated in the drawings.

It is to be noted that the terms "first", "second" and the like in the Description and claims of the present disclosure, and in the foregoing drawings, are used for distinguishing between similar objects and not necessarily for describing a particular order. The following embodiments of the present disclosure may be implemented individually, or may be implemented in combination with each other, which is not specifically limited in the embodiments of the present disclosure.

FIG. 1 is a flowchart of a cylinder deactivation control method of an engine according to an embodiment of the present disclosure.

As shown in FIG. 1, the cylinder deactivation control method of the engine specifically includes the steps described below.

In S101, a current crankshaft rotation angle of a to-be-controlled engine and a current crankshaft rotation speed of the to-be-controlled engine are acquired.

In S102, whether the to-be-controlled engine is at a cylinder deactivation trigger moment is determined based on the current crankshaft rotation angle.

Figure 2:
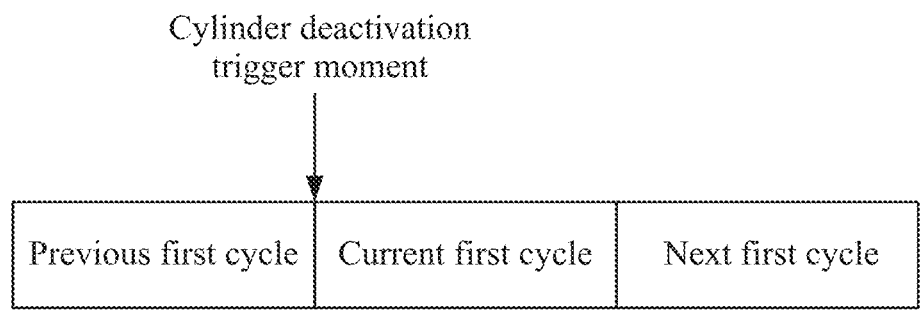
FIG. 2 is a schematic diagram of a cylinder deactivation trigger moment according to an embodiment of the present disclosure.

Specifically, FIG. 2 is a schematic diagram of a cylinder deactivation trigger moment according to an embodiment of the present disclosure. As shown in FIG. 2, in the present application, the control logic is set to trigger once in each first cycle, and a trigger moment may be set to a moment at which a first cylinder of the engine is located at an upper dead point of an intake stroke. Each time of trigger involves three adjacent first cycles, and the three adjacent first cycles are referred to as a previous first cycle, a current first cycle, and a next first cycle, separately. Optionally, the first cycle is a working period during which a crankshaft of the to-be-controlled engine completes a 720-degree rotation.

Optionally, S102, in which whether the to-be-controlled engine is at the cylinder deactivation trigger moment is determined based on the current crankshaft rotation angle includes: determining whether the current crankshaft rotation angle is an integral multiple of 720; and in response to a determination that the current crankshaft rotation angle is the integral multiple of 720, making the to-be-controlled engine at the cylinder deactivation trigger moment.

Specifically, for a four-stroke piston reciprocating engine, one working cycle is completed every 720-degree rotation of a crankshaft of the four-stroke piston reciprocating engine; therefore, a working period during which the crankshaft completes a 720-degree rotation is referred to as one first cycle. After the current crankshaft rotation angle of the to-be-controlled engine is acquired, whether the to-be-controlled engine is at the cylinder deactivation trigger moment may be further determined by determining whether the current crankshaft rotation angle is the integral multiple of 720.

In S103, in response to a determination that the to-be-controlled engine is at the cylinder deactivation trigger moment, a working condition region of the next first cycle is determined based on the current crankshaft rotation speed and a current target torque.

Specifically, for the to-be-controlled engine, when different numbers of cylinders work, in order to maintain the optimal working state of the to-be-controlled engine, torques required by different numbers of cylinders are different, and rotation speeds required by different numbers of cylinders are different. Therefore, when the determination is that the to-be-controlled engine is at the cylinder deactivation trigger moment at this time, the working condition region in which the next first cycle is located needs to be further determined.

Optionally, S103 in which the working condition region of the next first cycle is determined based on the current crankshaft rotation speed and the current target torque includes: querying a preset working condition region table based on the current crankshaft rotation speed and the current target torque to determine the working condition region of the next first cycle.

Figure 3:
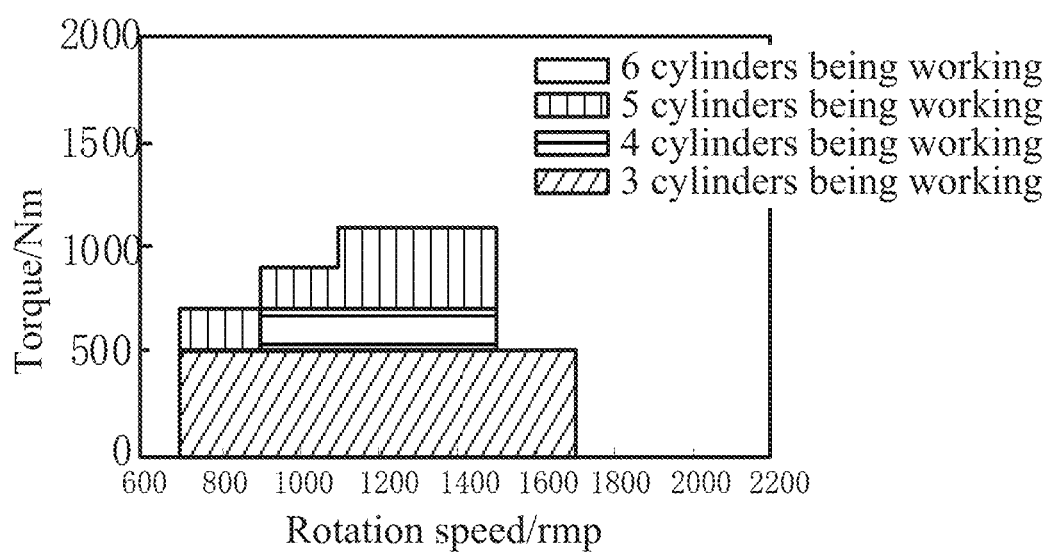
FIG. 3 is a schematic diagram of a preset working condition region chart according to an embodiment of the present disclosure.

In some embodiments, FIG. 3 is a schematic diagram of a preset working condition region chart according to an embodiment of the present disclosure. As shown in FIG. 3, FIG. 3 is a schematic diagram of a rotation speed and a torque that are obtained by means of calculation through the simulation experiment and that keep the to-be-controlled engine to be in an optimal working state when the to-be-controlled engine is a six-cylinder engine and different numbers of cylinders work. Therefore, after the current crankshaft rotation speed of the to-be-controlled engine and the current target torque of the to-be-controlled engine are obtained, the preset working condition region chart is queried according to the current crankshaft rotation speed and the current target torque to determine the working condition region corresponding to the next first cycle.

In S104, it is determined whether the working condition region of the next first cycle is identical to a working condition region corresponding to a second cycle in which the current first cycle is located.

Optionally, the second cycle is a working period of the to-be-controlled engine which is formed by a preset number of first cycles, where the number of cylinders that ignite normally is equal in each first cycle, and the number of ignition times of each cylinder is the same.

Specifically, the second cycle refers to a working period of the to-be-controlled engine which is formed by one or more first cycles. Moreover, the number of cylinders that ignites normally is equal in each first cycle in the second cycle, and the number of ignition times of each cylinder is equal in one second cycle. Specifically, according to the barrel theory, the second cycle is used to control the dynamic cylinder deactivation of the to-be-controlled engine, and a situation where a working load of an individual cylinder is significantly higher than those of other cylinders does not occur, so that loads of each cylinder can be ensured to be balanced, and thus the second cycle can enable the to-be-controlled engine to have a relatively long life in the cylinder deactivation working state. Moreover, since the number of cylinder deactivations is the same in each first cycle in one second cycle, so that when the to-be-controlled engine works repeatedly in the same second cycle, the number of cylinder deactivations in each first cycle remains unchanged, thereby being conducive to achieving a relatively stable working state of the to-be-controlled engine.

In S105, in response to a determination that the working condition region of the next first cycle is identical to the working condition region corresponding to the second cycle in which the current first cycle is located, a cylinder pressure form of each cylinder in the current first cycle is determined based on a cylinder deactivation mode of the previous first cycle, a cylinder deactivation mode of the current first cycle, and a cylinder deactivation mode of the next first cycle.

Optionally, the second cycle matrix represents an ignition state of each cylinder in the second cycle, and one second cycle matrix corresponds to and characterizes one second cycle.

Specifically, the second cycle matrix is a matrix representation manner of the second cycle. Each row of the matrix corresponds to one first cycle of the to-be-controlled engine, each column of the matrix corresponds to one cylinder of the to-be-controlled engine, and the entire matrix corresponds to one second cycle of the to-be-controlled engine. A value of each element in the matrix may be 1 or 0 and represents whether a corresponding cylinder ignites normally in a corresponding first cycle, that is, 1 represents that the corresponding cylinder ignites in the corresponding first cycle, and 0 represents that the corresponding cylinder does not ignite in the corresponding first cycle. On this basis, in the second cycle matrix, a sum of each row is the number of working cylinders in each first cycle, and a sum of each column is the number of ignition times of each cylinder in one large cycle. Since the number of cylinder deactivations in each first cycle in one second cycle is the same, a sum of each row of one second cycle matrix is equal, and a sum of each column of the one second cycle matrix is also equal.

After the working condition region of the next first cycle is obtained, it is determined whether the working condition region of the next first cycle is identical to the working condition region corresponding to the second cycle in which the current first cycle is located. When the working condition region of the next first cycle is identical to the working condition region corresponding to the second cycle in which the current first cycle is located, it indicates that the second cycle in which the next first cycle is located is identical to the second cycle in which the current first cycle is located, and the next first cycle is in a same second cycle matrix as the current first cycle, and the next first cycle is a next row of a row in which the current first cycle is located.

For the four-stroke piston reciprocating engine, a reciprocating motion of a piston of the engine generally includes an intake stroke, a compression stroke, a power stroke of a high-temperature and high-pressure gas, and a stroke in which an exhaust valve is opened and the piston moves upward. In the four stroke processes, the one first cycle may be in different working conditions, such as the number of cylinder deactivation being increased, the number of cylinder deactivation being decreased, and the number of cylinder deactivation being unchanged. In different strokes, one first cycle may have different cylinder pressure states in a case of different working conditions. Therefore, in order to more accurately perform the cylinder deactivation control on the to-be-controlled engine, the cylinder pressure form of each cylinder in the current first cycle also is required to be determined based on the cylinder deactivation mode of the previous first cycle, the cylinder deactivation mode of the current first cycle, and the cylinder deactivation mode of the next first cycle, so that a preset fuel injection quantity chart of a corresponding first cycle is determined according to the determined cylinder pressure mode.

Optionally, S105 specifically includes: querying, based on the cylinder deactivation mode of the previous first cycle, the cylinder deactivation mode of the current first cycle, and the cylinder deactivation mode of the next first cycle, a preset cylinder pressure form chart to determine the cylinder pressure form of each cylinder in the current first cycle.

Specifically, a preset cylinder pressure form chart that is preset and calibrated is required to be queried only based on the cylinder deactivation mode of the previous first cycle, the cylinder deactivation mode of the current first cycle, and the cylinder deactivation mode of the next first cycle to determine which working condition of which stroke stage the cylinder pressure form of each cylinder in the current first cycle is in.

In S106, in response to a determination that the working condition region of the next first cycle is different from the working condition region corresponding to the second cycle in which the current first cycle is located, a position of the current first cycle in a second cycle matrix corresponding to the current first cycle is determined based on a relationship between the number of working cylinders in a working condition region in which the current first cycle is located and the number of working cylinders in the working condition region in which the next first cycle is located, and a cylinder pressure form of each cylinder in the current first cycle is determined based on a determined position.

Specifically, when the working condition region of the current first cycle is different from a working condition region corresponding to the second cycle in which the next first cycle is located, it indicates that the number of ignition cylinders of the current first cycle is different from the number of ignition cylinders of the next first cycle, the relationship between the number of ignition cylinders of the current first cycle and the number of ignition cylinders of the next first cycle (that is, the number of working cylinders described above) is required to be further determined, to determine the second cycle corresponding to the current first cycle, and further determine a position of the current first cycle in the second cycle corresponding to the current first cycle, whereby the cylinder pressure form of each cylinder in the current first cycle is determined according to the position of the current first cycle in the second cycle corresponding to the current first cycle.

In S107, a fuel injection quantity of each ignition cylinder in the current first cycle is determined based on the cylinder pressure form of each cylinder in the current first cycle.

Optionally, S107 specifically includes: querying, based on the cylinder pressure form of each cylinder in the current first cycle, a preset fuel injection quantity chart of the current first cycle to determine the fuel injection quantity of each ignition cylinder in the current first cycle.

Specifically, in order to more accurately perform the cylinder deactivation control on the to-be-controlled engine, one preset fuel injection quantity chart is correspondingly provided for one cylinder pressure form of one first cycle, after the cylinder pressure form of each cylinder in the current first cycle is determined, a preset fuel injection quantity chart of a corresponding first cycle is determined and queried based on the cylinder pressure form of each cylinder in the current first cycle, and finally the fuel injection quantity of each ignition cylinder in the current first cycle is determined and obtained.

In the embodiments of the present disclosure, the cylinder deactivation trigger moment of the to-be-controlled engine is determined, a second cycle and a cylinder deactivation mode corresponding to the next first cycle are determined according to a crankshaft rotation speed at the cylinder deactivation trigger moment, a target torque at the cylinder deactivation trigger moment, and a second cycle and a cylinder deactivation mode corresponding to the current first cycle at the cylinder deactivation trigger moment, then a cylinder pressure type of each cylinder in the current first cycle is determined in conjunction with cylinder deactivation modes of three adjacent first cycles, and finally the fuel injection quantity of each ignition cylinder in the current first cycle is determined based on the calibrated preset fuel injection quantity chart of the first cycle. Therefore, the technical problems that loads of each cylinder are unbalanced, a specific configuration cannot be performed for the specific model, the NVH and the reliability are poor, and the control strategy is complex in the dynamic cylinder deactivation technology of the dynamic skip fire are solved, and thus the technical effects that the working state of the engine is stable, the loads are balanced, the control strategy is simple in logic, and the control precision is relatively high are achieved.

Figure 4:
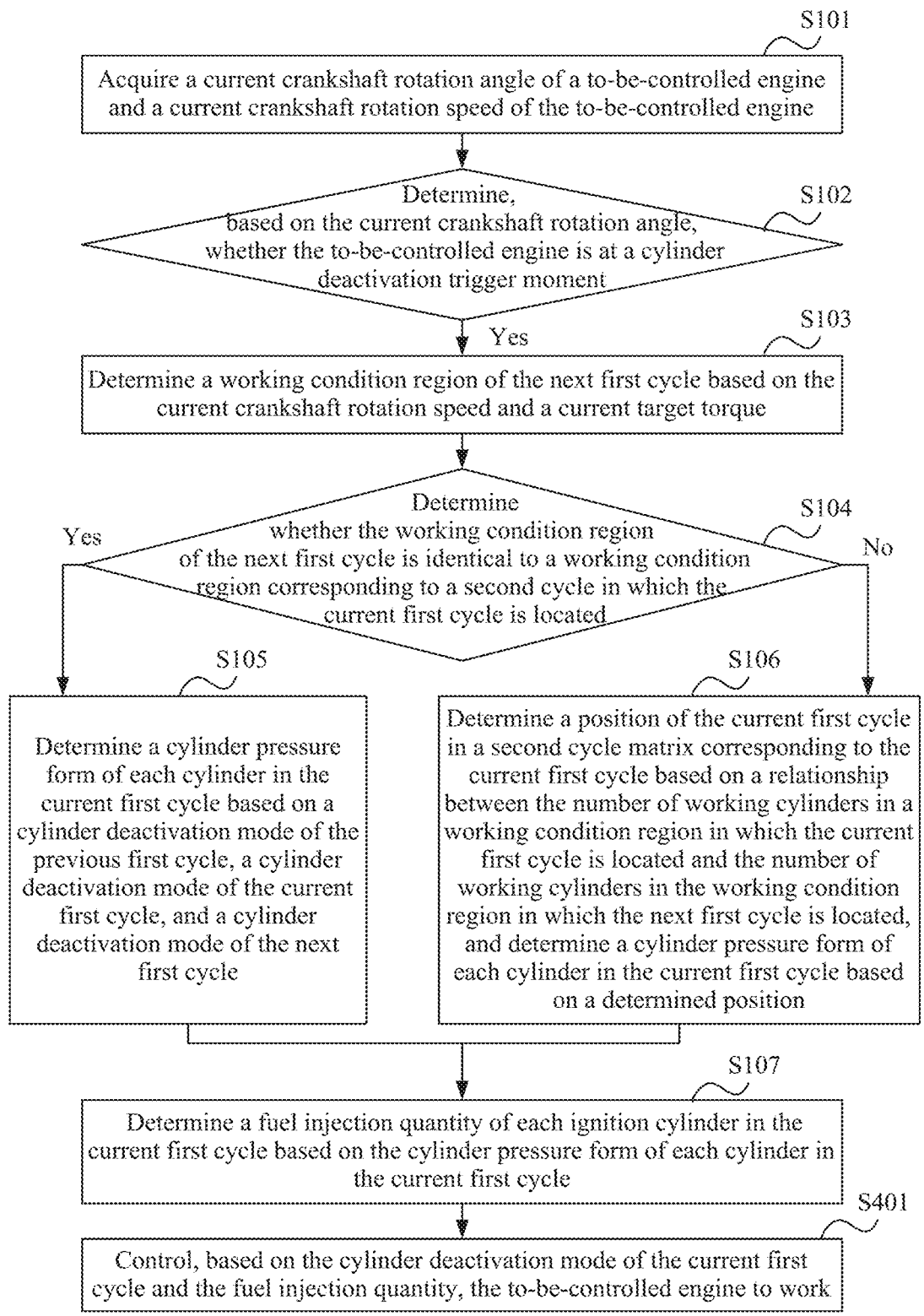
FIG. 4 is a flowchart of another cylinder deactivation control method of an engine according to an embodiment of the present disclosure.

Based on the above-described technical solutions, FIG. 4 is a flowchart of another cylinder deactivation control method of an engine according to an embodiment of the present disclosure. As shown in FIG. 4, after the fuel injection quantity of each ignition cylinder in the current first cycle is determined in S107, the cylinder deactivation control method of the engine further includes steps described below.

In S401, the to-be-controlled engine is controlled to work based on the cylinder deactivation mode of the current first cycle and the fuel injection quantity.

Specifically, after determining the fuel injection quantity of the ignition cylinder in the current first cycle, the to-be-controlled engine is controlled to work by using the cylinder deactivation mode of the current first cycle and the fuel injection quantity, thereby implementing the cylinder deactivation control of the to-be-controlled engine.

Figure 5:
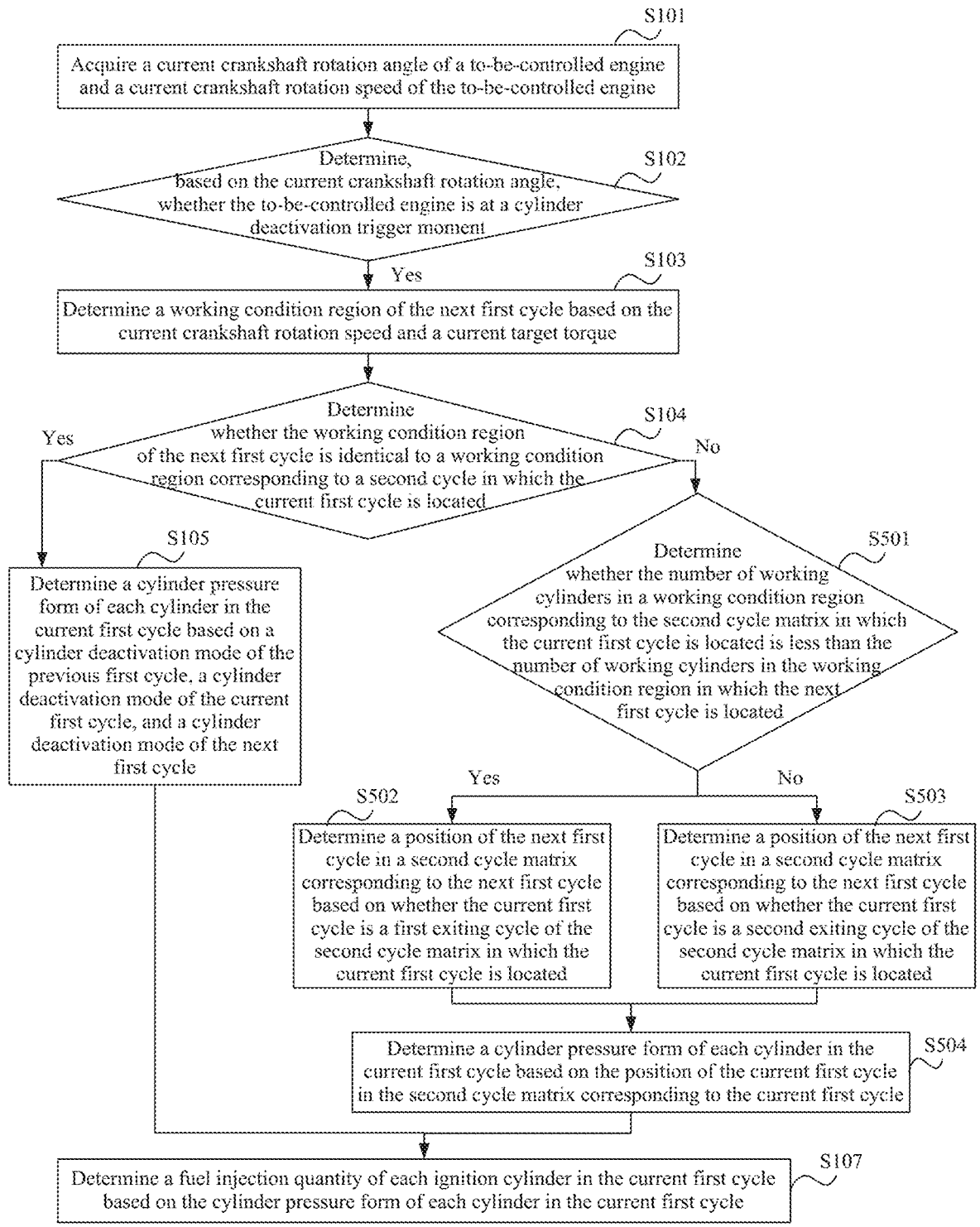
FIG. 5 is a flowchart of still another cylinder deactivation control method of an engine according to an embodiment of the present disclosure.

Based on the above-described technical solutions, FIG. 5 is a flowchart of still another cylinder deactivation control method of an engine according to an embodiment of the present disclosure. As shown in FIG. 5, S106 specifically includes steps described below.

In S501, whether the number of working cylinders in a working condition region corresponding to the second cycle matrix in which the current first cycle is located is less than the number of working cylinders in the working condition region in which the next first cycle is located is determined.

Specifically, if the working condition region of the current first cycle is different from the working condition region corresponding to the second cycle in which the next first cycle is located, it indicates that the number of ignition cylinders of the current first cycle is different from the number of ignition cylinders of the next first cycle; therefore, whether the number of ignition cylinders of the current first cycle is less than the number of ignition cylinders of the next first cycle (that is, the number of the working cylinders described above) is required to be further determined.

FIG. 6 is a schematic diagram of a second cycle matrix in which different numbers of cylinders ignite to work according to an embodiment of the present disclosure.

As shown in FIG. 6, four second cycle matrices are provided, and the four second cycle matrices are each a second cycle matrix whose number of ignition cylinders is 6, 5, 4, and 3 from top to bottom. A row of each second cycle matrix represents an ignition state of the cylinder, and a column of each second cycle matrix represents a numbering of the first cycle. It is to be noted that FIG. 6 exemplifies an optimal cylinder deactivation solution obtained by configuring and calibrating an engine of a certain model according to this model. In a practical use process, second cycle matrices of different engines may be set and calibrated according to different models, and the details are not repeated here.

In S502, in response to a determination that the number of working cylinders in the working condition region corresponding to the second cycle matrix in which the current first cycle is located is less than the number of working cylinders in the working condition region in which the next first cycle is located, a position of the next first cycle in a second cycle matrix corresponding to the next first cycle is determined based on whether the current first cycle is a first exiting cycle of the second cycle matrix in which the current first cycle is located.

Specifically, if the determining result is that the number of working cylinders in the working condition region corresponding to the second cycle matrix in which the current first cycle is located is less than the number of working cylinders in the working condition region corresponding to the second cycle matrix in which the next first cycle is located, it indicates that the second cycle matrix in which the next first cycle is located is different from the second cycle matrix in which the current first cycle is located; therefore, a cylinder deactivation mode represented by the second cycle matrix in which the current first cycle is located needs to be switched to a cylinder deactivation mode represented by the second cycle matrix in which the next first cycle is located, and thus the position of the next first cycle in the second cycle matrix corresponding to the next first cycle is required to be further determined.

Optionally, the first exiting cycle refers to a first cycle after a second cycle with the number of ignition cylinders being k−1 is exited, in a case where the to-be-controlled engine enters a second cycle with the number of ignition cylinders being k from the second cycle with the number of ignition cylinders being k−1; and a first entering cycle refers to a first cycle from a second cycle with the number of ignition cylinders being k is entered, in a case where the to-be-controlled engine enters the second cycle with the number of ignition cylinders being k from the second cycle with the number of ignition cylinders being k−1.

Optionally, S502 specifically includes: determining whether the current first cycle is the first exiting cycle of the second cycle matrix in which the current first cycle is located; in response to a determination that the current first cycle is the first exiting cycle of the second cycle matrix in which the current first cycle is located, making the next first cycle as a first entering cycle of the second cycle matrix in which the next first cycle is located; and in response to a determination that the current first cycle is not the first exiting cycle of the second cycle matrix in which the current first cycle is located, making the second cycle matrix in which the next first cycle is located identical to the second cycle matrix in which the current first cycle is located, and making the cylinder deactivation mode of the next first cycle as a next row of a row in which the current first cycle is located in the second cycle matrix.

Specifically, in a process of further determining a position of the next first cycle in a second cycle corresponding to the next first cycle, whether the current first cycle is the first exiting cycle of the second cycle matrix in which the current first cycle is located is required to be further determined. If the determining result is that the current first cycle is the first exiting cycle of the second cycle matrix in which the current first cycle is located, in this case, the to-be-controlled engine may be entered to a second cycle matrix with a larger number of ignition cylinders after the current first cycle is performed, and the next first cycle is the first entering cycle of the second cycle matrix corresponding to the next first cycle. In this case, the cylinder pressure form of the current first cycle is required to be further determined to determine a fuel injection quantity of the current first cycle. The second cycle matrix corresponding to the next first cycle is a second cycle matrix whose number of ignition cylinders is 1 more than the number of ignition cylinders of the second cycle matrix in which the current first cycle is located.

Specifically, if the determining result is that the current first cycle is not the first exiting cycle, the next first cycle still executes the second cycle matrix in which the current first cycle is located, that is, the second cycle matrix in which the next first cycle is located is identical to the second cycle matrix in which the current first cycle is located. In this case, the cylinder deactivation mode of the next first cycle is the next row of row in which the current first cycle is located in the second cycle matrix.

Specifically, in a cylinder deactivation mode represented by each second cycle matrix, one first cycle capable of switching upward or switching downward exists. Here, the "upward" switching refers to a switching to a second cycle matrix having the more number of working cylinders than those in the current second cycle matrix, and the "downward" switching refers to a switching to a second cycle matrix having the fewer number of working cylinders than those the current second cycle matrix.

In some embodiments, referring to FIG. 6, a second second cycle matrix in FIG. 6 represents a state in which five cylinders simultaneously ignite to work, and a first cycle of a row in which an upward arrow 1 pointing from a second cycle matrix in which the five cylinders simultaneously ignite to a second cycle matrix in which six cylinders simultaneously ignite is located is a first cycle with a numbering of 6, that is, it is represented that the first cycle with the numbering of 6 is a first cycle in which a switching to the second cycle matrix in which the six cylinders simultaneously work is performed, that is, the first cycle with the numbering of 6 is a first exiting cycle of the second cycle matrix in which the five cylinders simultaneously ignite to work. A first cycle of a row of the second cycle matrix in which the five cylinders simultaneously ignite and to which the upward arrow 1 points is also the first cycle with the numbering of 6, where the upward arrow 1 points from a second cycle matrix in which four cylinders simultaneously ignite to the second cycle matrix in which the five cylinders simultaneously ignite, that is, it is represented that the first cycle with the numbering of 6 is a first entering cycle of the second cycle in which the five cylinders simultaneously ignite to work.

In the embodiments of the present disclosure, in order to ensure a relatively small disturbance impact on the to-be-controlled engine due to the switching of the number of cylinder deactivations, it is specified that a switching between second cycles with different numbers of cylinder deactivations is performed only when the cylinder deactivation working condition regions are switched, that is, the switching cannot be performed randomly. Only when a working condition region in which a current cycle is located is different from a working condition region in which a next cycle is located and a switching of working condition regions is required to be performed, the switching of the number of cylinder deactivations occurs. Moreover, the number of cylinder deactivations between two second cycles switched with each other only differ by 1, in this way, the switching of the number of cylinder deactivations can be ensured to have the minimum disturbance impact on the to-be-controlled engine.

In S503, in response to a determination that the number of working cylinders in the working condition region corresponding to the second cycle matrix in which the current first cycle is located is greater than the number of working cylinders in the working condition region in which the next first cycle is located, a position of the next first cycle in a second cycle matrix corresponding to the next first cycle is determined based on whether the current first cycle is a second exiting cycle of the second cycle matrix in which the current first cycle is located.

Specifically, if the determining result is that the number of working cylinders in the working condition region corresponding to the second cycle matrix in which the current first cycle is located is greater than the number of working cylinders in the working condition region in which the next first cycle is located, it indicates that the second cycle matrix in which the current first cycle is located is different from the second cycle matrix in which the next first cycle is located; therefore, a cylinder deactivation mode represented by the second cycle matrix in which the current first cycle is located is required to be switched to a cylinder deactivation mode represented by the second cycle matrix in which the next first cycle is located, and in this case, the position of the next first cycle in the second cycle matrix corresponding to the next first cycle is required to be further determined.

Optionally, the second exiting cycle refers to a first cycle after a second cycle with the number of ignition cylinders being k is exited, in a case where the to-be-controlled engine is entered to a second cycle with the number of ignition cylinders being k–1 from the second cycle with the number of ignition cylinders being k; and the second entering cycle refers to a first cycle from a second cycle with the number of ignition cylinders being k–1 is entered, in a case where the to-be-controlled engine is entered to the second cycle with the number of ignition cylinders being k–1 from the second cycle with the number of ignition cylinders being k.

Optionally, S503 specifically includes: determining whether the current first cycle is the second exiting cycle of the second cycle matrix in which the current first cycle is located; in response to a determination that the current first cycle is the second exiting cycle of the second cycle matrix in which the current first cycle is located, making the next first cycle as a second entering cycle of the second cycle matrix in which the next first cycle is located; and in response to a determination that the current first cycle is not the second exiting cycle of the second cycle matrix in which the current first cycle is located, making the second cycle matrix in which the next first cycle is located identical to the second cycle matrix in which the current first cycle is located, and making the cylinder deactivation mode of the next first cycle as a next row of a row in which the current first cycle is located in the second cycle matrix.

Specifically, in a process of further determining a position of the next first cycle in a second cycle corresponding to the next first cycle, whether the current first cycle is the second exiting cycle of the second cycle matrix in which the current first cycle is located is required to be further determined. If the determining result is that the current first cycle is the second exiting cycle of the second cycle matrix in which the current first cycle is located, in this case, the to-be-controlled engine may be entered to a second cycle matrix with fewer ignition cylinders at the cylinder deactivation trigger moment, the next first cycle is a second entering cycle of the second cycle matrix corresponding to the next first cycle, and in this case, the cylinder pressure form of the current first cycle is required to be further determined to determine the fuel injection quantity of the current first cycle. The second cycle matrix corresponding to the next first cycle is a second cycle matrix whose number of ignition cylinders is 1 less than the number of ignition cylinders of the second cycle matrix in which the previous first cycle is located.

Specifically, if the determining result is that the current first cycle is not the second exiting cycle, the next first cycle still executes the second cycle matrix in which the current first cycle is located, that is, the second cycle matrix in which the next first cycle is located is identical to the second cycle matrix in which the current first cycle is located. In this case, the cylinder deactivation mode of the next first cycle is the next row of row in which the current first cycle is located in the second cycle matrix.

In some embodiments, referring to FIG. 6, a second second cycle matrix in FIG. 6 represents a state in which five cylinders simultaneously ignite to work, and a first cycle of a row in which a downward arrow 2 pointing from a second cycle matrix in which the five cylinders simultaneously ignite to a second cycle matrix in which four cylinders simultaneously ignite is located is a first cycle with a numbering of 6, that is, it is represented that the first cycle with the numbering of 6 is a first cycle in which a switching to the second cycle matrix in which the four cylinders simultaneously work is performed, that is, the first cycle with the numbering of 6 is a second exiting cycle of the second cycle matrix in which the five cylinders simultaneously ignite to work. It is to be noted that the downward arrow 2 pointing from a second cycle matrix in which six cylinders simultaneously ignite to the second circulation matrix in which the five cylinders simultaneously ignite indicates that a first cycle with a numbering of 1 is a second exiting cycle of the second circulation matrix in which the six cylinders simultaneously ignite to work; and the downward arrow 2 pointing from the second cycle matrix in which the four cylinders simultaneously ignite to a second circulation matrix in which three cylinders simultaneously ignite indicates that the first cycle with the numbering of 1 is a second exiting cycle of the second circulation matrix in which the four cylinders simultaneously ignite to work. Similarly, the arrow 1 or the arrow 2 in FIG. 6 is used to indicate an "upward" or "downward" entering matrix or an "upward" or "downward" exiting matrix in a corresponding second cycle matrix, and details are not repeated here.

In S504, a cylinder pressure form of each cylinder in the current first cycle is determined based on the position of the current first cycle in the second cycle matrix corresponding to the current first cycle.

Optionally, S504 specifically includes: determining the cylinder deactivation mode of the current first cycle based on the position of the current first cycle in the second cycle matrix corresponding to the current first cycle; and querying, based on the cylinder deactivation mode of the previous first cycle, the cylinder deactivation mode of the current first cycle, and the cylinder deactivation mode of the next first cycle, a preset cylinder pressure form chart to determine the cylinder pressure form of each cylinder in the current first cycle.

Specifically, after the position of the current first cycle in the second cycle matrix corresponding to the current first cycle is obtained, the cylinder deactivation mode of the current first cycle may be determined, and then a preset cylinder pressure form chart that is preset and calibrated is required to be queried only based on the cylinder deactivation mode of the previous first cycle, the cylinder deactivation mode of the current first cycle, and the cylinder deactivation mode of the next first cycle to determine which working condition of which stroke stage the cylinder pressure form of each cylinder in the current first cycle is in.

In the embodiments of the present disclosure, (1) in a second cycle in which the number of cylinder deactivations is not zero or a total number of cylinders, each cylinder has a state of cylinder deactivation and a state of working; therefore, the number of first cycles included in the second cycle is generally not too large, and thus, a gas filling operation is not required. (2) The cylinder deactivation control method in the present application is flexible, that is, a final cylinder deactivation solution of each model is calculated and calibrated according to a specific model configuration; therefore, the optimal configuration for each model can be implemented. (3) In the present application, a fuel injection quantity chart of each first cycle in each second cycle is separately calibrated, the calibration process thereof is more precise, and thus the accuracy is high, so that the fuel injection quantity and the average torque of each first cycle ignition cylinder in the whole working process of the to-be-controlled engine can be accurately controlled, which is conducive to achieving the more stable working state of the to-be-controlled engine. (4) The cylinder deactivation control method of the engine provided in the present application is simple and clear in logic, which not only fully exploits the technical advantage of dynamic cylinder deactivation, but also facilitates the optimization research and electronic control implementation of the method itself.

Figure 7:
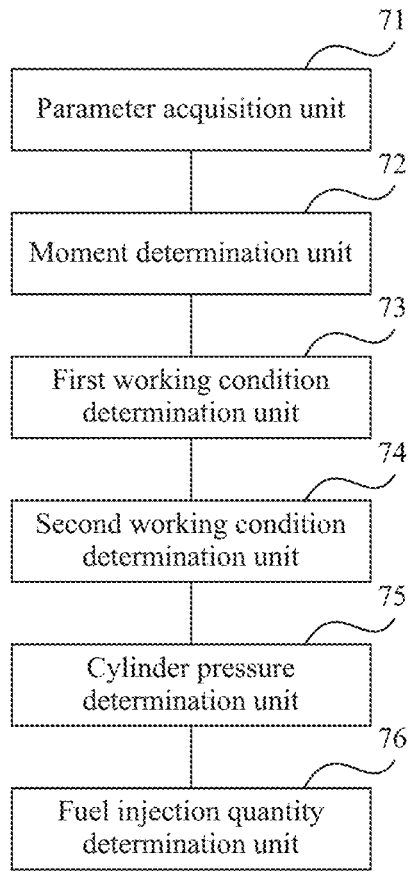
FIG. 7 is a structural diagram of a cylinder deactivation control apparatus of an engine according to an embodiment of the present disclosure.

FIG. 7 is a structural diagram of a cylinder deactivation control apparatus of an engine according to an embodiment of the present disclosure.

As shown in FIG. 7, the cylinder deactivation control apparatus of the engine specifically includes a parameter acquisition unit 71, a moment determination unit 72, a first working condition determination unit 73, a second working condition determination unit 74, a cylinder pressure determination unit 75 and a fuel injection quantity determination unit 76. The parameter acquisition unit 71 is configured to acquire a current crankshaft rotation angle of a to-be-controlled engine and a current crankshaft rotation speed of the to-be-controlled engine. The moment determination unit 72 is configured to determine, based on the current crankshaft rotation angle, whether the to-be-controlled engine is at a cylinder deactivation trigger moment. The first working condition determination unit 73 is configured to determine a working condition region of a next first cycle based on the current crankshaft rotation speed and a current target torque in response to a determination of the moment determination unit 72 that the to-be-controlled engine is at the cylinder deactivation trigger moment. The second working condition determination unit 74 is configured to determine whether the working condition region of the next first cycle is identical to a working condition region corresponding to a second cycle in which a current first cycle is located. The cylinder pressure determination unit 75 is configured to: in response to a determination of the second working condition determination unit 74 that the working condition region of the next first cycle is identical to the working condition region corresponding to the second cycle in which the current first cycle is located, determine a cylinder pressure form of each cylinder in the current first cycle based on a cylinder deactivation mode of a previous first cycle, a cylinder deactivation mode of the current first cycle, and a cylinder deactivation mode of the next first cycle; and in response to a determination of the second working condition determination unit 74 that the working condition region of the next first cycle is different from the working condition region corresponding to the second cycle in which the current first cycle is located, determine a position of the current first cycle in a second cycle matrix corresponding to the current first cycle based on a relationship between the number of working cylinders in a working condition region in which the current first cycle is located and the number of working cylinders in the working condition region in which the next first cycle is located, and determine a cylinder pressure form of each cylinder in the current first cycle based on a determined position. The fuel injection quantity determination unit 76 is configured to determine a fuel injection quantity of each ignition cylinder in the current first cycle based on the cylinder pressure form of each cylinder in the current first cycle.

Optionally, after the fuel injection quantity determination unit 76 determines the fuel injection quantity of each ignition cylinder in the current first cycle, the cylinder deactivation control apparatus of the engine further includes a control unit, and the control unit is configured to control, based on the cylinder deactivation mode of the current first cycle and the fuel injection quantity, the to-be-controlled engine to work.

Optionally, the fuel injection quantity determination unit 76 is specifically configured to query, based on the cylinder pressure form of each cylinder in the current first cycle, a preset fuel injection quantity chart of the current first cycle to determine the fuel injection quantity of each ignition cylinder in the current first cycle.

Optionally, the cylinder pressure determination unit 75 includes a determination subunit, a position determination subunit and a cylinder pressure determination subunit. The determination subunit is configured to determine whether the number of working cylinders in a working condition region corresponding to the second cycle matrix in which the current first cycle is located is less than the number of working cylinders in the working condition region in which the next first cycle is located. The position determination subunit is configured to: in response to a determination of the determination subunit that the number of working cylinders in the working condition region corresponding to the second cycle matrix in which the current first cycle is located is less than the number of working cylinders in the working condition region in which the next first cycle is located, determine a position of the next first cycle in a second cycle matrix corresponding to the next first cycle based on whether the current first cycle is a first exiting cycle of the second cycle matrix in which the current first cycle is located; and in response to a determination of the determination subunit that the number of working cylinders in the working condition region corresponding to the second cycle matrix in which the current first cycle is located is greater than the number of working cylinders in the working condition region in which the next first cycle is located, determine a position of the next first cycle in a second cycle matrix corresponding to the next first cycle based on whether the current first cycle is a second exiting cycle of the second cycle matrix in which the current first cycle is located. The cylinder pressure determination subunit is configured to determine the cylinder pressure form of each cylinder in the current first cycle based on the position of the current first cycle in the second cycle matrix corresponding to the current first cycle.

Optionally, the position determination subunit is specifically configured to: determine whether the current first cycle is the first exiting cycle of the second cycle matrix in which the current first cycle is located; in response to a determination that the current first cycle is the first exiting cycle of the second cycle matrix in which the current first cycle is located, make the next first cycle be a first entering cycle of the second cycle matrix in which the next first cycle is located; and in response to a determination that the current first cycle is not the first exiting cycle of the second cycle matrix in which the current first cycle is located, make the second cycle matrix in which the next first cycle is located identical to the second cycle matrix in which the current first cycle is located, and make the cylinder deactivation mode of the next first cycle be a next row of a row in which the current first cycle is located in the second cycle matrix.

Optionally, the position determination subunit is further specifically configured to: determine whether the current first cycle is the second exiting cycle of the second cycle matrix in which the current first cycle is located; in response to a determination that the current first cycle is the second exiting cycle of the second cycle matrix in which the current first cycle is located, make the next first cycle be a second entering cycle of the second cycle matrix in which the next first cycle is located; and in response to a determination that the current first cycle is not the second exiting cycle of the second cycle matrix in which the current first cycle is located, make the second cycle matrix in which the next first cycle is located identical to the second cycle matrix in which the current first cycle is located, and make the cylinder deactivation mode of the next first cycle be a next row of a row in which the current first cycle is located in the second cycle matrix.

Optionally, the cylinder pressure determination subunit is specifically configured to: determine the cylinder deactivation mode of the current first cycle based on the position of the current first cycle in the second cycle matrix corresponding to the current first cycle; and query, based on the cylinder deactivation mode of the previous first cycle, the cylinder deactivation mode of the current first cycle, and the cylinder deactivation mode of the next first cycle, a preset cylinder pressure form chart to determine the cylinder pressure form of each cylinder in the current first cycle.

Optionally, the first working condition determination unit 73 is specifically configured to query a preset working condition region table based on the current crankshaft rotation speed and the current target torque to determine the working condition region of the next first cycle.

Optionally, the moment determination unit is specifically configured to: determine whether the current crankshaft rotation angle is an integral multiple of 720; and in response to a determination that the current crankshaft rotation angle is the integral multiple of 720, make the to-be-controlled engine be at the cylinder deactivation trigger moment.

Optionally, the cylinder pressure determination unit 75 is specifically configured to query, based on the cylinder deactivation mode of the previous first cycle, the cylinder deactivation mode of the current first cycle, and the cylinder deactivation mode of the next first cycle, a preset cylinder pressure form chart to determine the cylinder pressure form of each cylinder in the current first cycle.

The cylinder deactivation control apparatus of the engine provided in the embodiments of the present disclosure may perform the cylinder deactivation control method of the engine provided in any of the embodiments of the present disclosure, and has corresponding function modules and beneficial effects for performing the method.

In some embodiment, the cylinder deactivation control apparatus of an engine includes a memory, a processor, and a computer program stored on the memory and executable on the processor. The processor, when executing the computer program, implements the method of any one of the embodiments.

Figure 8:
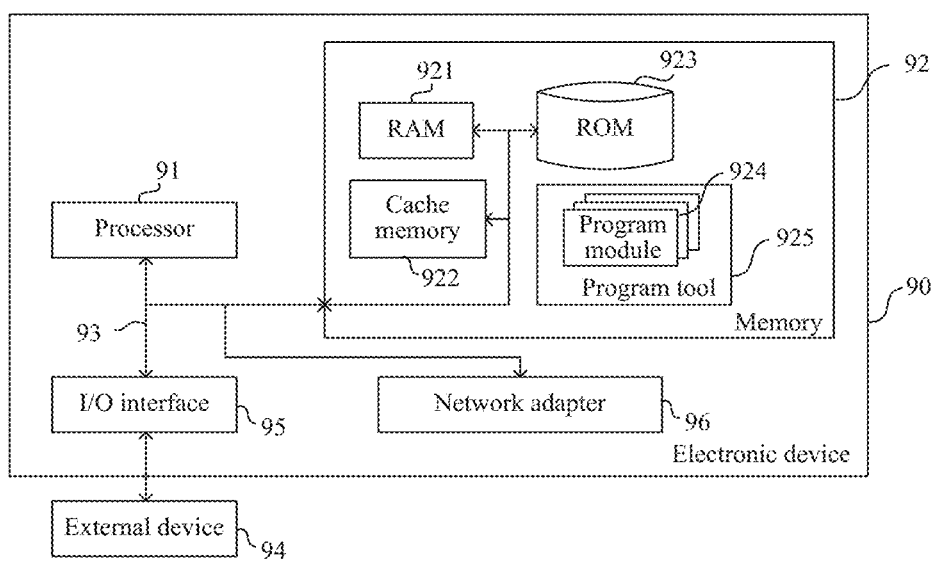
FIG. 8 is a schematic structural diagram of a cylinder deactivation control apparatus of an engine according to an embodiment of the present disclosure.

As shown in FIG. 8, the apparatus may be embodied in a form of a general purpose calculation device, which may be, for example, a server device. The assemblies of the electronic device 90 may include, but are not limited to, at least one processor 91, at least one memory 92, and a bus 93 that connects different system assemblies (including the memory 92 and the processor 91).

The bus 93 includes a data bus, an address bus, and a control bus.

The memory 92 may include a volatile memory, such as a random access memory (RAM) 921 and/or a cache memory 922, and may further include a read only memory (ROM) 923.

The memory 92 may further include a program tool 925 having a set of (at least one) program modules 924, such program modules include, but are not limited to, an operating system, one or more application programs, other program modules, and program data, and each or some combination of these examples may include implementations of a network environment.

The processor 91 executes various functional applications and data processing by running a computer program stored in the memory 92.

The electronic device 90 may also communicate with one or more external devices 94 (e.g., a keyboard, a pointing device, etc.). Such communication may occur via an input/output (I/O) interface 95. Moreover, the electronic device 90 may also communicate with one or more networks (e.g., a local area network (LAN), a wide area network (WAN), and/or a public network such as the Internet) through a network adapter 96. The network adapter 96 communicates with other modules of the electronic device 90 through the bus 93. It should be appreciated that although not shown in the drawings, other hardware and/or software modules may be used in connection with the electronic device 90, the other hardware and/or software modules include, but are not limited to, a microcode, a device driver, a redundant processor, an external disk drive array, a RAID (disk array) system, a tape driver, and a data backup storage system, and the like.

According to the embodiment of the present disclosure, the method described above with reference to the flowchart may be implemented as a computer software program. For example, the embodiment of the present disclosure includes a computer program product. The computer program product includes a computer program carried in a non-transitory computer-readable medium. The computer program includes program codes for performing the method shown in the flowchart.

An embodiment of the present disclosure further provides an engine, and the engine is configured to perform the cylinder deactivation control apparatus of the engine in any of the above-described embodiments.

The engine provided in the embodiments of the present disclosure uses the cylinder deactivation control method of the engine in the above-described embodiments. Therefore, the engine provided in the embodiments of the present disclosure also has the beneficial effects described in the above-described embodiments, and the details are not repeated here.

In the description of the embodiments of the present disclosure, it should be noted that terms "mounted", "joined" and "connected" are to be understood in a broad sense unless otherwise expressly specified and limited. For example, the term "connected" may refer to "fixedly connected" or "detachably connected" or "integrally connected", may refer to "mechanically connected" or "electrically connected" or may refer to "connected directly", "connected indirectly through an intermediary" or "connected inside two components". For those of ordinary skill in the art, specific meanings of the preceding terms in the present disclosure may be understood based on specific situations.

Finally, it is to be noted that the foregoing description merely depicts illustrative embodiments and the technical principles applied thereto of the present disclosure. It is to be understood by those skilled in the art that the present disclosure is not limited to the particular embodiments described herein, and that various variations, rearrangements and substitutions may be made without departing from the scope of protection of the present disclosure. Therefore, although the present disclosure has been described in detail with reference to the above embodiments, the present disclosure is not limited to the above embodiments, and may further include other equivalent embodiments without departing from the concept of the present disclosure, and the scope of the present disclosure is defined by the scope of the appended claims.

What is claimed is:

1. A cylinder deactivation control method of an engine, comprising:

acquiring a current crankshaft rotation angle of a to-be-controlled engine and a current crankshaft rotation speed of the to-be-controlled engine;

determining, based on the current crankshaft rotation angle, whether the to-be-controlled engine is at a cylinder deactivation trigger moment;

in response to a determination that the to-be-controlled engine is at the cylinder deactivation trigger moment, determining a working condition region of a next first cycle based on the current crankshaft rotation speed and a current target torque;

determining whether the working condition region of the next first cycle is identical to a working condition region corresponding to a second cycle in which a current first cycle is located;

in response to a determination that the working condition region of the next first cycle is identical to a working condition region corresponding to the second cycle in which the current first cycle is located, determining a cylinder pressure form of each cylinder in the current first cycle based on a cylinder deactivation mode of a previous first cycle, a cylinder deactivation mode of the current first cycle, and a cylinder deactivation mode of the next first cycle;

in response to a determination that the working condition region of the next first cycle is different from the working condition region corresponding to the second cycle in which the current first cycle is located, determining a position of the current first cycle in a second cycle matrix corresponding to the current first cycle based on a relationship between a number of working cylinders in a working condition region in which the current first cycle is located and a number of working cylinders in the working condition region in which the next first cycle is located, and determining a cylinder pressure form of each cylinder in the current first cycle based on a determined position of the current first cycle in the second cycle matrix corresponding to the current first cycle; and determining a fuel injection quantity of each ignition cylinder in the current first cycle based on the cylinder pressure form of each cylinder in the current first cycle.

2. The cylinder deactivation control method of an engine of claim 1, after determining the fuel injection quantity of each ignition cylinder in the current first cycle, the cylinder deactivation control method of the engine further comprises:
controlling, based on the cylinder deactivation mode of the current first cycle and the fuel injection quantity, the to-be-controlled engine to work.

3. The cylinder deactivation control method of an engine of claim 1, wherein determining the fuel injection quantity of each ignition cylinder in the current first cycle based on the cylinder pressure form of each cylinder in the current first cycle comprises:

querying, based on the cylinder pressure form of each cylinder in the current first cycle, a preset fuel injection quantity chart of the current first cycle to determine the fuel injection quantity of each ignition cylinder in the current first cycle.

4. The cylinder deactivation control method of an engine of claim 1, wherein the first cycle is a working period during which a crankshaft of the to-be-controlled engine completes a 720-degree rotation, the second cycle is a working period of the to-be-controlled engine which is formed by a preset number of first cycles, where a number of cylinders that ignites normally is equal in each first cycle and a number of ignition times of each cylinder is equal; the second cycle matrix represents an ignition state of each cylinder in the second cycle, and one second cycle matrix corresponds to and characterizes one second cycle.

5. The cylinder deactivation control method of an engine of claim 1, wherein determining the position of the current first cycle in the second cycle matrix corresponding to the current first cycle based on the relationship between the number of working cylinders in the working condition region in which the current first cycle is located and the number of working cylinders in the working condition region in which the next first cycle is located, and determining the cylinder pressure form of each cylinder in the current first cycle based on the determined position comprises:

determining whether a number of working cylinders in a working condition region corresponding to the second cycle matrix in which the current first cycle is located is less than the number of working cylinders in the working condition region in which the next first cycle is located;

in response to a determination that the number of working cylinders in the working condition region corresponding to the second cycle matrix in which the current first cycle is located is less than the number of working cylinders in the working condition region in which the next first cycle is located, determining a position of the next first cycle in a second cycle matrix corresponding to the next first cycle based on whether the current first cycle is a first exiting cycle of the second cycle matrix in which the current first cycle is located;

in response to a determination that the number of working cylinders in the working condition region corresponding to the second cycle matrix in which the current first cycle is located is greater than the number of working cylinders in the working condition region in which the next first cycle is located, determining a position of the next first cycle in a second cycle matrix corresponding to the next first cycle based on whether the current first cycle is a second exiting cycle of the second cycle matrix in which the current first cycle is located; and determining the cylinder pressure form of each cylinder in the current first cycle based on the position of the current first cycle in the second cycle matrix corresponding to the current first cycle.

6. The cylinder deactivation control method of an engine of claim 5, wherein determining the position of the next first cycle in the second cycle matrix corresponding to the next first cycle based on whether the current first cycle is the first exiting cycle of the second cycle matrix in which the current first cycle is located comprises:

determining whether the current first cycle is the first exiting cycle of the second cycle matrix in which the current first cycle is located;

in response to a determination that the current first cycle is the first exiting cycle of the second cycle matrix in which the current first cycle is located, making the next first cycle as a first entering cycle of the second cycle matrix in which the next first cycle is located; and in response to a determination that the current first cycle is not the first exiting cycle of the second cycle matrix in which the current first cycle is located, making the second cycle matrix in which the next first cycle is located identical to the second cycle matrix in which the current first cycle is located, and making the cylinder deactivation mode of the next first cycle as a next row of a row in which the current first cycle is located in the second cycle matrix.

7. The cylinder deactivation control method of an engine of claim 6, wherein the first exiting cycle refers to a first cycle after a second cycle with a number of ignition cylinders being k−1 is exited, in a case where the to-be-controlled engine is entered to a second cycle with a number of ignition cylinders being k from the second cycle with the number of ignition cylinders being k−1; and the first entering cycle refers to a first cycle from which a second cycle with the number of ignition cylinders being k is entered, in a case where the to-be-controlled engine is entered to the second cycle with the number of ignition cylinders being k from the second cycle with the number of ignition cylinders being k−1.

8. The cylinder deactivation control method of an engine of claim 5, wherein determining the position of the next first cycle in the second cycle matrix corresponding to the next first cycle based on whether the current first cycle is the second exiting cycle of the second cycle matrix in which the current first cycle is located comprises:

determining whether the current first cycle is the second exiting cycle of the second cycle matrix in which the current first cycle is located;

in response to a determination that the current first cycle is the second exiting cycle of the second cycle matrix in which the current first cycle is located, making the next first cycle as a second entering cycle of the second cycle matrix in which the next first cycle is located; and in response to a determination that the current first cycle is not the second exiting cycle of the second cycle matrix in which the current first cycle is located, making the second cycle matrix in which the next first cycle is located identical to the second cycle matrix in which the current first cycle is located, and making the cylinder deactivation mode of the next first cycle as a next row of a row in which the current first cycle is located in the second cycle matrix.

9. The cylinder deactivation control method of an engine of claim 8, wherein the second exiting cycle refers to a first cycle after a second cycle with a number of ignition cylinders being k is exited, in a case where the to-be-controlled engine is entered to a second cycle with a number of ignition cylinders being k−1 from the second cycle with the number of ignition cylinders being k; and the second entering cycle refers to a first cycle from which the second cycle with the number of ignition cylinders being k−1 is entered, in a case where the to-be-controlled engine is entered to the second cycle with the number of ignition cylinders being k−1 from the second cycle with the number of ignition cylinders being k.

10. The cylinder deactivation control method of an engine of claim 5, wherein determining the cylinder pressure form of each cylinder in the current first cycle based on the position of the current first cycle in the second cycle matrix corresponding to the current first cycle comprises:

determining the cylinder deactivation mode of the current first cycle based on the position of the current first cycle in the second cycle matrix corresponding to the current first cycle; and querying, based on the cylinder deactivation mode of the previous first cycle, the cylinder deactivation mode of the current first cycle, and the cylinder deactivation mode of the next first cycle, a preset cylinder pressure form chart to determine the cylinder pressure form of each cylinder in the current first cycle.

11. The cylinder deactivation control method of an engine of claim 1, wherein determining the working condition region of the next first cycle based on the current crankshaft rotation speed and the current target torque comprises:

querying a preset working condition region table based on the current crankshaft rotation speed and the current target torque to determine the working condition region of the next first cycle.

12. The cylinder deactivation control method of an engine of claim 1, wherein determining the cylinder pressure form of each cylinder in the current first cycle based on the cylinder deactivation mode of the previous first cycle, the cylinder deactivation mode of the current first cycle, and the cylinder deactivation mode of the next first cycle comprises:

querying, based on the cylinder deactivation mode of the previous first cycle, the cylinder deactivation mode of the current first cycle, and the cylinder deactivation mode of the next first cycle, a preset cylinder pressure form chart to determine the cylinder pressure form of each cylinder in the current first cycle.

13. A cylinder deactivation control apparatus of an engine, comprising a memory, a processor, and a computer program stored on the memory and executable on the processor, wherein the processor is configured to implement a cylinder deactivation control method of an engine when executing the computer program;

wherein the cylinder deactivation control method of an engine comprises:

acquiring a current crankshaft rotation angle of a to-be-controlled engine and a current crankshaft rotation speed of the to-be-controlled engine;

determining, based on the current crankshaft rotation angle, whether the to-be-controlled engine is at a cylinder deactivation trigger moment;

in response to a determination that the to-be-controlled engine is at the cylinder deactivation trigger moment, determining a working condition region of a next first cycle based on the current crankshaft rotation speed and a current target torque;

determining whether the working condition region of the next first cycle is identical to a working condition region corresponding to a second cycle in which a current first cycle is located;

in response to a determination that the working condition region of the next first cycle is identical to a working condition region corresponding to the second cycle in which the current first cycle is located, determining a cylinder pressure form of each cylinder in the current first cycle based on a cylinder deactivation mode of a previous first cycle, a cylinder deactivation mode of the current first cycle, and a cylinder deactivation mode of the next first cycle;

in response to a determination that the working condition region of the next first cycle is different from the working condition region corresponding to the second cycle in which the current first cycle is located, determining a position of the current first cycle in a second cycle matrix corresponding to the current first cycle based on a relationship between a number of working cylinders in a working condition region in which the current first cycle is located and a number of working cylinders in the working condition region in which the next first cycle is located, and determining a cylinder pressure form of each cylinder in the current first cycle based on a determined position of the current first cycle in the second cycle matrix corresponding to the current first cycle; and determining a fuel injection quantity of each ignition cylinder in the current first cycle based on the cylinder pressure form of each cylinder in the current first cycle.

14. A non-transitory computer-readable medium, which is configured to store a computer program which, when executed by a processor, performs a cylinder deactivation control method of an engine;

wherein the cylinder deactivation control method of an engine comprises:

acquiring a current crankshaft rotation angle of a to-be-controlled engine and a current crankshaft rotation speed of the to-be-controlled engine;

determining, based on the current crankshaft rotation angle, whether the to-be-controlled engine is at a cylinder deactivation trigger moment;

in response to a determination that the to-be-controlled engine is at the cylinder deactivation trigger moment, determining a working condition region of a next first cycle based on the current crankshaft rotation speed and a current target torque;

determining whether the working condition region of the next first cycle is identical to a working condition region corresponding to a second cycle in which a current first cycle is located;

in response to a determination that the working condition region of the next first cycle is identical to a working condition region corresponding to the second cycle in which the current first cycle is located, determining a cylinder pressure form of each cylinder in the current first cycle based on a cylinder deactivation mode of a previous first cycle, a cylinder deactivation mode of the current first cycle, and a cylinder deactivation mode of the next first cycle;

in response to a determination that the working condition region of the next first cycle is different from the working condition region corresponding to the second cycle in which the current first cycle is located, determining a position of the current first cycle in a second cycle matrix corresponding to the current first cycle based on a relationship between a number of working cylinders in a working condition region in which the current first cycle is located and a number of working cylinders in the working condition region in which the next first cycle is located, and determining a cylinder pressure form of each cylinder in the current first cycle based on a determined position of the current first cycle in the second cycle matrix corresponding to the current first cycle; and determining a fuel injection quantity of each ignition cylinder in the current first cycle based on the cylinder pressure form of each cylinder in the current first cycle.

15. The non-transitory computer-readable medium of claim 14, after determining the fuel injection quantity of each ignition cylinder in the current first cycle, the cylinder deactivation control method of the engine further comprises: controlling, based on the cylinder deactivation mode of the current first cycle and the fuel injection quantity, the to-be-controlled engine to work.

16. The non-transitory computer-readable medium of claim 14, wherein determining the fuel injection quantity of each ignition cylinder in the current first cycle based on the cylinder pressure form of each cylinder in the current first cycle comprises:

querying, based on the cylinder pressure form of each cylinder in the current first cycle, a preset fuel injection quantity chart of the current first cycle to determine the fuel injection quantity of each ignition cylinder in the current first cycle.

17. The non-transitory computer-readable medium of claim 14, wherein the first cycle is a working period during which a crankshaft of the to-be-controlled engine completes a 720-degree rotation, the second cycle is a working period of the to-be-controlled engine which is formed by a preset number of first cycles, where a number of cylinders that ignites normally is equal in each first cycle and a number of ignition times of each cylinder is equal; the second cycle matrix represents an ignition state of each cylinder in the second cycle, and one second cycle matrix corresponds to and characterizes one second cycle.

18. The non-transitory computer-readable medium of claim 14, wherein determining the position of the current first cycle in the second cycle matrix corresponding to the current first cycle based on the relationship between the number of working cylinders in the working condition region in which the current first cycle is located and the number of working cylinders in the working condition region in which the next first cycle is located, and determining the cylinder pressure form of each cylinder in the current first cycle based on the determined position comprises:

determining whether a number of working cylinders in a working condition region corresponding to the second cycle matrix in which the current first cycle is located is less than the number of working cylinders in the working condition region in which the next first cycle is located;

in response to a determination that the number of working cylinders in the working condition region corresponding to the second cycle matrix in which the current first cycle is located is less than the number of working cylinders in the working condition region in which the next first cycle is located, determining a position of the next first cycle in a second cycle matrix corresponding to the next first cycle based on whether the current first cycle is a first exiting cycle of the second cycle matrix in which the current first cycle is located;

in response to a determination that the number of working cylinders in the working condition region corresponding to the second cycle matrix in which the current first cycle is located is greater than the number of working cylinders in the working condition region in which the next first cycle is located, determining a position of the next first cycle in a second cycle matrix corresponding to the next first cycle based on whether the current first cycle is a second exiting cycle of the second cycle matrix in which the current first cycle is located; and determining the cylinder pressure form of each cylinder in the current first cycle based on the position of the current first cycle in the second cycle matrix corresponding to the current first cycle.

19. The non-transitory computer-readable medium of claim 18, wherein determining the position of the next first cycle in the second cycle matrix corresponding to the next first cycle based on whether the current first cycle is the first exiting cycle of the second cycle matrix in which the current first cycle is located comprises:

determining whether the current first cycle is the first exiting cycle of the second cycle matrix in which the current first cycle is located;

in response to a determination that the current first cycle is the first exiting cycle of the second cycle matrix in which the current first cycle is located, making the next first cycle as a first entering cycle of the second cycle matrix in which the next first cycle is located; and in response to a determination that the current first cycle is not the first exiting cycle of the second cycle matrix in which the current first cycle is located, making the second cycle matrix in which the next first cycle is located identical to the second cycle matrix in which the current first cycle is located, and making the cylinder deactivation mode of the next first cycle as a next row of a row in which the current first cycle is located in the second cycle matrix.

20. The non-transitory computer-readable medium of claim 19, wherein the first exiting cycle refers to a first cycle after a second cycle with a number of ignition cylinders being k−1 is exited, in a case where the to-be-controlled engine is entered to a second cycle with a number of ignition cylinders being k from the second cycle with the number of ignition cylinders being k−1; and the first entering cycle refers to a first cycle from which a second cycle with the number of ignition cylinders being k is entered, in a case where the to-be-controlled engine is entered to the second cycle with the number of ignition cylinders being k from the second cycle with the number of ignition cylinders being k−1.

\* \* \* \* \*